Jan. 2, 1968              S. E. SZASZ              3,361,226
GAS EXPLODER SEISMIC DEVICE
Filed Feb. 18, 1966              2 Sheets-Sheet 1
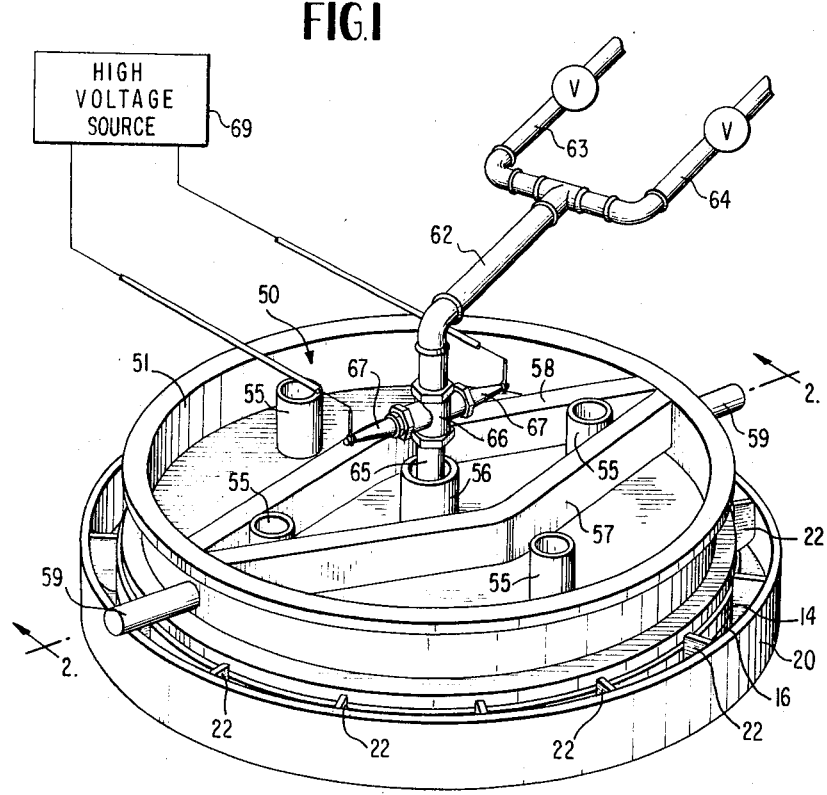
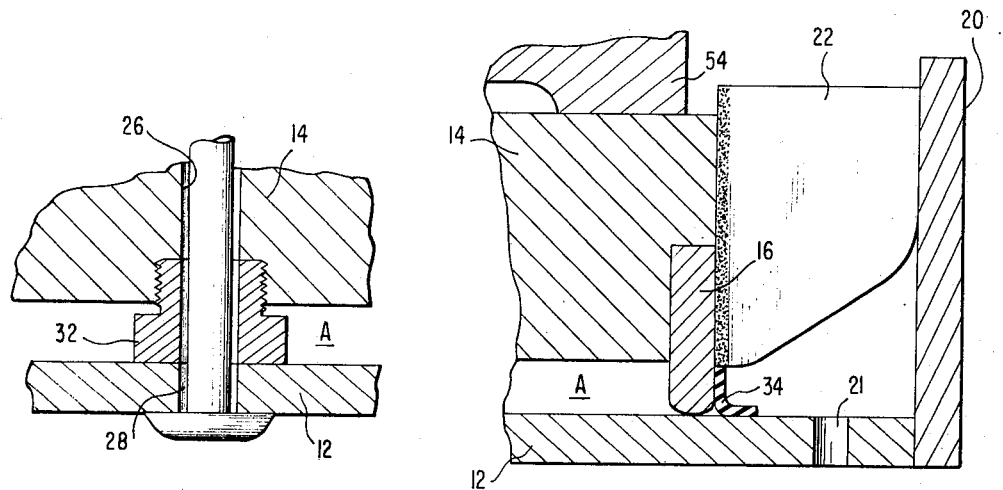
INVENTOR
STEPHEN E. SZASZ
BY McLean, Morton & Baustead
ATTORNEY

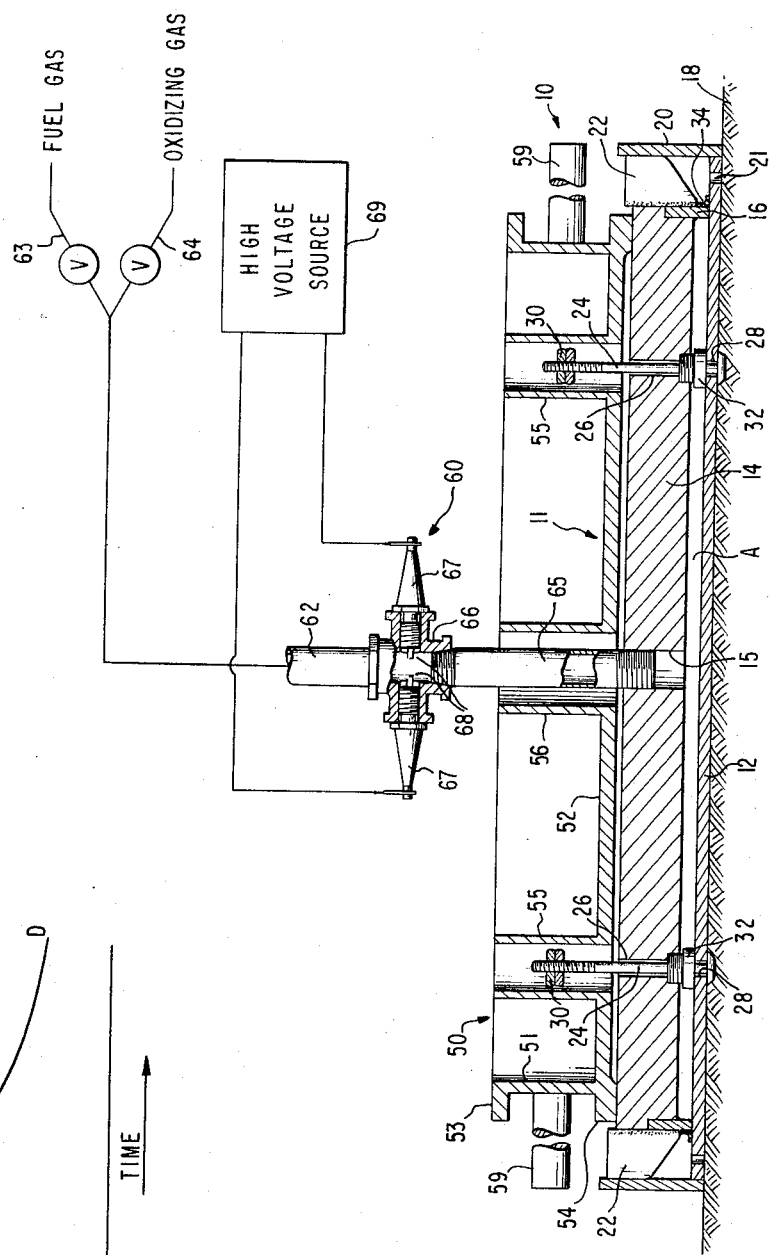

United States Patent Office 3,361,226
Patented Jan. 2, 1968

3,361,226
GAS EXPLODER SEISMIC DEVICE
Stephen E. Szasz, Tulsa, Okla., assignor, by mesne assignments, to Sinclair Research, Inc., New York, N.Y., a corporation of Delaware
Filed Feb. 18, 1966, Ser. No. 528,550
10 Claims. (Cl. 181—.5)

ABSTRACT OF THE DISCLOSURE

A gas exploder for generating a seismic wave constructed with the transmission plate adapted to be coupled to or rest on the ground being only a flat, rigid metal plate having a reaction mass resting thereon without any permanent seal by means of a sidewall. The mass forms with the transmission plate a chamber adapted to, at least temporarily, hold a charge of combustible gas mixture. A combustible gas mixture can be introduced into the chamber through, for example, a central opening, in which ignition means can also be provided for exploding the mixture.

---

This invention relates to geophysical exploration and pertains more particularly to apparatus for generating seismic waves such as employed in seismic prospecting methods.

In seismic prospecting, the strata near the earth's surface are investigated by studying records of artificially produced elastic or seismic waves. By this method artificial disturbances produced at a shot-point station cause the earth to be set in motion, and this motion is detected and recorded at several seismometer stations located at known distances from the shot-point station.

A common method of creating an artificial disturbance in the earth's surface is to drill a shot hole into the earth's surface below the so-called weathered layer and to position a charge of dynamite at the bottom of the hole where it is exploded. This method is relatively expensive, time-consuming and dangerous, as considerable time must be expended in drilling the holes and there is a certain element of danger in handling the dynamite charges and loading them into the shot holes. Additionally, the resultant explosion from the dynamite normally causes a cavity in the earth which makes it impossible to fire two shots at the same point under identical conditions. Furthermore, such cavities must be filled in afterwards or remain a hazard to people and livestock.

Another well-known method of creating an artifical disturbance in the earth's surface is to drop a heavy weight on the ground, a method which can successfully be used in some areas. Due to the unevenness of the terrain being explored, however, it is not always possible to drop the weight from the same height each time a disturbance is to be produced. Additionally, the mechanism for releasing the weight at the drop signal does not always function with the same smoothness. Because of these two factors, the time interval between the signal releasing the weight and the time it contacts the ground is not always the same. Since the recording system which forms the seismogram traces starts recording at the time the weight is released, the arrivals of the waves as shown on different seismograms can not be properly synchronized with each other due to the time variation between the signal releasing the weight and its contact with the ground. This error necessitates the shifting of seismograms during the study of the results, especially in cases when reproducible recording, e.g., on magnetic tape, is used.

To overcome the disadvantages of both the above-described methods, a third method involving the explosion of gaseous mixtures above the ground have been developed. Co-pending Kilmer applications Ser. No. 187,111, filed Apr. 12, 1962, now Patent No. 3,235,027 and Ser. No. 314,230, filed Oct. 7, 1963, now Patent No. 3,314,497, describe energy sources for producing seismic impulses by explosion of gaseous mixtures. These devices can be repeatedly used following a regular cycle of pulsed or sequential firing at equal or variable time intervals. In general, the devices described in said copending applications use a gas explosion confined in a closed, vertically expansible chamber to impart a compressive impulse and initiate a seismic wave. The chamber which contains the gas explosion has a rigid bottom pressure plate of considerable area which is adapted to be coupled to the ground and which transmits the force of the explosion to the land, air or water medium to be seismically explored. The plate is coupled to the ground, for example, by a dead weight of substantial mass surmounting the expandible chamber. The explosion or violent combustion of a gas mixture in the chamber produces a shock wave which ordinarily would be transmitted equally in all directions, however, the great inertia of the dead weight surmounting the chamber and the lateral rigidity of the walls of the chamber direct against the major portion of the force of the explosion downwardly against the pressure plate, thus causing a substantial movement of the plate, which, as mentioned, is of considerable area. The force of the explosion thus applies compressive stress quickly at the interface beneath the chamber to initiate a seismic wave. The combustion gas mixture usually includes air or oxygen mixed with a combustible gas such as propane, propylene, ethylene, acetylene, etc.

Although gas exploders of this type have been performing satisfactorily in actual use, some problems have arisen such as deformation in the transmission plate which is difficult and expensive to make. Also, there is no provision for flushing out the exhaust gases; hence, the incoming gas mixture is diluted and contaminated, thus reducing the efficiency of the exploder. Furthermore, the role of the reaction mass, and its influence on the performance characteristics of the exploder, is such that competitive seismic systems, i.e., weight dropping, can use lighter carrier vehicles.

Recently it has been discovered that the intensity of the seismic signal produced by exploding gaseous mixtures is proportional to the peak pressure in the chamber, and, hence, the design of the chamber should insure that the explosive gaseous mixture is not diluted nor contaminated. Additionally, it has been discovered that the gas exploder operates more like the cylinder of an engine rather than like exploding dynamite so that in order to make full use of the energy of combustion, exhaust of the combustion products should not begin before all the gas has burned. Furthermore, the reaction mass used heretofore appears to have little influence on the strength of the seismic signal produced. The mass of the transmission plate also has but little influence and movement of the transmission plate is governed primarily by the characteristics of the ground with which it is in contact.

With these precepts in mind, it has now been found that a highly effective gas exploder can be provided without the necessity of a closed chamber having a sidewall or a permanent seal and without the necessity of having a large reaction mass surmounting the chamber. Thus, in accordance with this invention, a gas exploder for generating a seismic wave can be constructed with the transmission plate adapted to be coupled to or rest on the ground being only a flat, rigid metal plate without any machining. A reaction mass rests on the transmission plate without any permanent seal by means of a sidewall and forms with the transmission plate a chamber adapted to, at least temporarily, hold a charge of a combustible gas mixture. Variation in weight of the reaction mass can be used to control the shape of the seismic pulse, i.e., the frequency spectrum of the pulse. A combustible gas mixture can be introduced into the chamber through, for example, a central opening, in which ignition means can also be provided for exploding the mixture. After ignition at the center, the combustion in the chamber, and also the pressure wave associated with it, will propagate radially outward and reach the outer edge of the chamber only when combustion is completed. Hence, no elaborate permanent seal is necessary along the circumference of the chamber and combustion gas left in the chamber after the explosion is flushed out by the incoming new explosive mixture through the imperfect seal along the sidewall.

It is an object of this invention, therefore, to provide a new and improved gas exploder which permits flushing of the exhaust gas when refilling the chamber, uses the minimum reaction weight consistent with any given operating conditions and permissible height of bounce, eliminates the necessity for a permanent seal at the circumference of the chamber and, hence, eliminates the need for precision machining, and utilizes a transmission plate design of utmost simplicity.

The specific nature of this invention, as well as other objects, uses, and advantages thereof will clearly appear from the following description and from the accompanying drawing, in which:

FIGURE 1 is an isometric view of a gas exploder constructed in accordance with this invention;

FIGURE 2 is a vertical section taken at line 2—2 in FIGURE 1;

FIGURES 3 and 4 each illustrate a modification of the device illustrated in FIGURE 2; and FIGURE 5 is a curve illustrating the relationship between the force of the seismic pulse and time.

Referring now to FIGURE 2 the gas exploder, generally designated by reference numeral 10, is constituted by chamber A, which is formed by transmission plate 12, i.e., a flat steel plate obtained, for example, without any machining, and a body, generally designated by reference numeral 11, formed by top plate 14, having a central opening 15, and sidewall 16. The edge of sidewall 16, which may be welded to top plate 14, rests without any special seal upon the transmission plate 12, which in turn rests on the ground surface 18. The sidewall 20, secured to transmission plate 12, serves to direct exhaust gas upward and, together with upstanding guides 22, which are attached, e.g., welded to top plate 14, serves to position the body 11 on bottom plate 12. Drain holes 21 are provided for removal of any accumulated water from exploder 10, particularly chamber A. Bolts 24 loosely positioned in the holes 26 and 28 provided, respectively, in top plate 14 and transmission plate 12, together with nuts 30 threaded on the bolts 24 serve to limit movement of the body 11 with respect to the transmission plate 12 upon an explosion in chamber A and to provide a connection between the transmission plate 12 and top plate 14 for ease of transportation. Alternately, any other suitable means of securing bottom plate 12 to top plate 14 can be used as long as they permit free relative movement of said top and bottom plates from the contact position and until they are a certain distance, typically several inches apart, e.g., flexible cables or chains attached to both top and bottom plates. The number of bolts used can vary within wide limits. Spacers 32, see FIGURE 3, can be placed around bolts 24 to assist in spacing top plate 14 from bottom plate 12 and relieve some pressure from sidewall 16, if desired. Also, if desired, a flexible seal 34, see FIGURE 4, can be attached to sidewall 16 to provide a loose temporary seal of chamber A when sidewall 16 rests on transmission plate 12.

It will be noted gas exploder 10, as illustrated in FIGURES 1 and 2, is further equipped with a shallow cylindrical tank 50 including, as an integral part, a cylindrical sidewall 51, an annular bottom plate 52, outwardly extending, annular flanges 53 and 54 at the upper and lower ends of sidewall 51, respectively, and four upstanding sleeves 55 having their lower ends disposed in openings in plate 52 registering with openings 26 but having wider diameters than openings 26 to accommodate nuts 30. In addition, the central aperture of plate 52 is also provided with an integral, upstanding sleeve 56 the lower end of which is disposed in such central aperture. Tank 50 is further provided with a pair of slightly bowed braces 57 and 58 which are in juxtaposition with their adjacent end pairs close and welded to to the inside of sidewall 51 and with their centers bowed away from each other with sleeve 56 between them.

Exteriorly tank 50 is provided at diametrically opposite positions in its sidewall 51 with a pair of outwardly extending stub shafts 59 which are secured to sidewall 51, each adjacent one pair of adjacent ends of braces 57 and 58. Stub shafts 59 can be used for carrying gas exploder 10 in a fork-type device. If desired, tank 50 can retain a lead casting within sidewall 51 for extra weight. In such case sleeves 55 and sleeve 56 serve to provide access to openings 26 and 15, respectively.

Referring also to FIGURES 1 and 2 gas exploder 10 further requires a gas charging and ignition system generally designated by the reference number 60. Charging and ignition system 60 basically includes an upstanding conduit 62 interconnected at its upper end to separate valved connections 63 and 64 leading to storage cylinders respectively for fuel gas, e.g., propylene or other suitable combustible gas, and for oxidizing gas such as oxygen.

Upstanding conduit 62 includes a pipe section 65 threadedly received at its lower end in tapped aperture 15 in plate 14 and threadedly received on the upper end of such pipe section 61, a four-way fitting 66. Conduit 62 generally includes suitable nipples, elbow and T's as well as pipe sections to provide connection communicating the upper opening of the four-way fitting 66 with valved conduits 63 and 64.

Two spark plugs 67 having their ground electrodes removed are connected to four-way fitting 66 in the lateral openings of fitting 66 such that, as shown most clearly in FIGURE 2, the insulated electrodes 68 of each of plugs 67 face each other in such fitting 66. Exteriorly spark plugs 67, thus mounted, are electrically connected across a suitable electrical supply 69 which is capable of impressing a high voltage, typically on the order of 70,000 volts, across serially interconnected spark plugs 67 at any desired instant in time. If desired, only one spark plug, or more than two spark plugs in close proximity to each other, can be used.

In operation gas exploder 10 is located at a suitable location with bottom 12 resting on the ground at a spot clear of large stones and other undesirable structure. Valve conduits 63 and 64 are then opened to admit propylene and oxygen until a pressure in exploder 10 on the order of 2 p.s.i.g. has been achieved. (It will be apparent that a stoichiometric mixture of oxygen and propylene are sought and that this is achieved quite simply by introducing the gases such that the partial pressures of each are in proportion to the molar ratio of a stoichiometric mixture, i.e., $4.5:1::O_2C_3H_6$.) With valved conduits 63 and 64 closed, exploder 10 is properly charged and an explosion can be initiated simply by actuating high voltage source 69 at the desired point in time, whereupon high potential is placed across the series connection of the spark plugs 67.

A complete operating cycle of the exploder of this invention consists of five phases including filling, combustion, exhaust, bounce and return. In filling, a stoichiometric mixture of oxygen and propylene, or propane or other combustible gas, such as propylene, ethane, ethylene, etc., enters chamber A between body 11 and transmission plate 12 through the central filling opening 15 and pipe section 65 and drives the exhaust gas from the previous cycle outward, where it escapes through the imperfect seal between sidewall 16 and transmission plate 12. To facilitate this escape, holes or slits (not shown) can be provided in the sidewall and to make this escape uniform along the circumference of the chamber when the exploder rests on uneven terrain, a curtain or seal 34, see FIGURE 4, extending below the edge of the sidewall and made, e.g., of reinforced rubber, can be fastened to the outside of the sidewall 16. Typically, the filling phase lasts several seconds and is adjusted so that the total volume of incoming mixture is equal to the volume of the chamber. The limits on the fill pressure in chamber A are determined by the weight on the chamber divided by the cross-sectional area of the chamber and typically will be on the order of several, e.g., 2 to 5, p.s.i.g.

During the combustion phase, the gas mixture in chamber A is ignited, for example, by closing the circuit across high voltage source 69 by a radio signal from a recording truck, not shown. Combustion is accompanied by a rise in average pressure in chamber A to about 10–16 atm., and the pressure wave travels outward at about the velocity of sound. As a consequence, the upward force exerted on the body 11 and the downward force on the transmission plate 12 are given at any time by the product between average pressure behind the pressure wave and the area covered by the pressure wave. Until this wave reaches the circumference of chamber A, i.e., sidewall 16, there is no pressure difference across the gap between transmission plate 12 and the sidewall 16, hence no leakage of gas, and a seal is not necessary. On the other hand, this also means that loss of gas and pressure cannot occur before the pressure wave reaches the outer edge of the chamber A; hence, the pressure created by combustion is fully utilized. This combustion phase lasts typically for about 1–2 milliseconds, depending mainly on the diameter of the chamber A. Because of this short duration there is very little actual movement of the body 11 and the transmission plate 12 during this phase, i.e., the burning gas is effectively confined. The use of a single central firing point is prefered in this invention since the length of the combustion period is proportional to the shortest distance between any firing point and any exhaust point and it is desired to have a relatively long combustion period as discussed hereinbelow.

When the pressure wave reaches the outer edge of the chamber A, gas leaks out and pressure is lost at an increasing rate, because the upward movement of the body 11 and the downward movement of the transmission plate 12 progressively increase the width of the gap between body and plate. The rate of widening of the gap, hence, the rate of pressure loss and the duration of this exhaust phase, depend on the movement of the body 11: the larger its mass (including any extra weight), the slower it moves, the slower it widens the gap and the longer it takes to exhaust the gas. The movement of the transmission plate 12 depends mainly on the elastic characteristics of the ground and very little on the mass of the transmission plate. The transmission plate 12 remains in contact with the ground 18 throughout this exhaust phase. Typically, the exhaust phase lasts from 3 to 15 milliseconds. The movement of the body 11 has, in general, a much larger effect on the widening of the gap and on the duration of the exhaust phase than the movement of the transmission plate. FIGURE 5 illustrates the relationship between the force of the seismic signal generated by exploder 10 and time for each explosion in chamber A. The curve B–C represents the combined combustion and exhaust phases of the operating cycle and curve C–D represents the remainder of the cycle. As can be easily seen, the pulse produced during the combustion period can be correlated with the time required for each phase of the operating cycle, also the frequency content or spectrum of the pulse can also be changed by varying the slope of the curve B–C through the size of the recreation mass which governs the rate at which the combustion gases are exhausted. For example, with a large mass, low frequencies are produced since a curve B–C having a large slope is obtained through having a slow exhaust. For any given locality there is a desirable optimum frequency.

At the end of the exhaust phase, there is no pressure in the chamber and no forces exerted on the body 11 and on the transmission plate 12. As far as the seismic signal is concerned, the power cycle consists of the combustion and exhaust phases, curve B–C of FIGURE 5. The body 11, however, has acquired an upwardly velocity, i.e., kinetic energy, and continues to move upward until this kinetic energy is converted into gravitational potential energy. The height to which the body 11 bounces is proportional to the square of the velocity at the end of the exhaust phase. This velocity, in turn, is proportional to the upward force, the duration of the last two, i.e., combustion and exhaust phases, and inversely proportional to the mass of the body. This invention includes a self-correcting feature with respect to the height of bounce: a larger mass moves more slowly during these last two phases, the gap opens more slowly, gas pressure is lost more slowly, the exhaust phase lasts longer, and the heavier mass reaches almost the same upward velocity as a lighter mass. Accordingly, by varying the mass of, or on, the body 11 the length of the power cycle can be changed without excessive variation of the height of the bounce.

In the return phase, the body 11 drops back onto the transmission plate 12 and to the ground 18. Although this furnishes a second seismic signal similar to weight dropping, it can be made not to interfere with the first and desired signal by introducing a sufficient delay between them. A natural delay which can be calculated from the height of the bounce and is typically of at least 100 and up to several hundred milliseconds is given by the law of free fall. Also the delay can be determined by the construction of the chamber, independent of other parameters; if the height of the chamber, and hence the volume of gas fill, is increased with all other parameters remaining the same, the peak combustion pressure and the peak upward force on the body will remain the same, the rate at which the exhaust gap widens will remain the same, but because there is more gas to exhaust, the exhaust phase will last longer, the terminal velocity of the body will be larger, the bounce higher and the delay between the first and second seismic signal longer. The height of the chamber can be easily changed by inserts 32 which may be of aluminum or plastic in combination with a curtain 34, see FIGURES 3 and 4. Such inserts can also be used to give the chamber volume a non-uniform profile, and thus effect modifications in the shape of the seismic pulse expressed as force on the transmission plate as a function of time.

In general, the size of chamber A in the gas exploder 10 will vary from a height of about ¼ to about 2 inches, preferably about ½ to 1 inch, and from a diameter of about 2 to about 7 feet with the actual dimension being determined by the desired impulse frequencies. The reaction mass will generally vary from about 1 to 15, preferably 2 to 7, pounds per square inch of bottom or transmission plate. Additional inlets for fuel gas and oxidizing gas can be added if desired.

Field tests were conducted using an exploder constructed as described above. A 19 c.p.s. geophone, located 200 ft. deep in a hole filled with water, was used to record each impulse and the response to all impacts was recorded on magnetic tape and played back on paper records with the same amplifier and filter settings (for playbacks: 10–60 c.p.s. filter, 6% gain) without AGC. When the exploder top plate assembly was set down on a flat steel bottom plate, there was a 2 inch high chamber between plate and exploder body. The top plate assembly had only one central hole which was equipped with a spark plug assembly and the fill line was also connected to this hole. Pressure regulator settings for oxygen and propane were 26 p.s.i.g. propane pressure and 50 p.s.i.g. oxygen pressure. Tests were conducted with 5 seconds and 8 seconds fill times for the gases. The maximum amplitude for the exploder records for 5 seconds fill time was 43.0 mm. The fact that the amplitude for 8 seconds fill time which was 89.9 mm., and is about twice the amplitude for 5 seconds fill time (43.0 mm.), shows that the amplitude is a reliable indicator of use in energy input.

It is claimed:

1. Apparatus for initiating a seismic wave which includes means defining a chamber including a rigid bottom plate adapted to be coupled to the ground and a rigid top member loosely resting on said bottom plate and forming therewith an imperfect seal, said top member being vertically movable with respect to said bottom plate between a first position and a second position, said top member when in said first position defining with said bottom plate said chamber and when moved toward said second position opening said chamber at the rim thereof to exhaust the same simultaneously with said movement, gas charging and flushing means for the chamber including fluid conduit means affixed to said first-mentioned means communicating with the interior of said chamber for charging the chamber with a combustible gas mixture and for flushing the gases in the chamber out of the chamber through said imperfect seal when the top member is in the first position, and ignition means for igniting said mixture, said top member having a substantially greater mass than said bottom plate.

2. Apparatus as defined in claim 1 in which said bottom plate and top member are joined together by bolt means which extend through the plate and member and limit upward movement of said top member.

3. Apparatus as defined in claim 1 further including spacer elements separating said top member and bottom plate.

4. Apparatus as defined in claim 1 further including a resilient skirt at the edge of said top member providing a temporary seal at the edge of said chamber.

5. Apparatus as defined in claim 1 in which said fluid conduit means is affixed to said top member centrally thereof and coincides with an opening in said top, said ignition means including a pair of insulated electrodes positioned in said conduit means to define a gap therein.

6. Apparatus as defined in claim 1 wherein the bottom plate includes an upstanding annular flange and said top member rests within the flange and has a diameter less than the diameter of the flange, and guide elements attached to said top member for positioning the top member within the flange and for guiding the top member in its movement toward the second position.

7. Apparatus as defined in claim 6 including means for limiting movement of the top member with respect to the bottom plate.

8. Apparatus as defined in claim 7 wherein the last mentioned means are bolt means extending through the bottom plate and the top member and including spacer elements separating said top member and bottom plate.

9. Apparatus as defined in claim 8 including drain means in the bottom plate.

10. Apparatus as defined in claim 9 in which said fluid conduit means is affixed to said top member centrally thereof and coincides with an opening in said top, said ignition means including a pair of insulated electrodes positioned in said conduit means to define a gap therein.

References Cited
UNITED STATES PATENTS

| | | | |
|---|---|---|---|
| 2,322,043 | 6/1943 | McCune | 92—168 X |
| 2,979,938 | 4/1961 | Ottestad | 73—12 |
| 3,029,733 | 4/1962 | McElroy | 181—0.5 |
| 3,138,073 | 6/1964 | Whitehouse | 92—165 X |
| 3,152,523 | 10/1964 | Whitfield et al. | 92—213 |
| 3,189,121 | 6/1965 | Vander Stoep | 181—0.5 |
| 3,198,282 | 8/1965 | Dunaway | 181—0.5 |
| 3,235,027 | 2/1966 | Kilmer | 181—0.5 |
| 3,260,327 | 7/1966 | McCollum | 181—0.5 |
| 3,277,977 | 10/1966 | Silverman | 181—0.5 |
| 3,288,244 | 11/1966 | Kirby | 181—0.5 |

BENJAMIN A. BORCHELT, *Primary Examiner.*

W. KUJAWA, *Assistant Examiner.*